2,864,685
PROCESS FOR MIXED FERTILIZER CONTAINING UREAFORM

Charles E. Waters, Petersburg, and Joseph A. Smith, Richmond, Va., assignors to Allied Chemical Corporation, New York, N. Y., a corporation of New York No Drawing. Application July 14, 1955
Serial No. 522,157

7 Claims. (Cl. 71—29)

This invention relates to a mixed fertilizer and a process for making the same; more particularly, it relates to a nitrogen-phosphorus-potassium or nitrogen-phosphorus fertilizer in which nitrogen is supplied in the form of a reaction product of urea and formaldehyde which contains nitrogen in a water insoluble form and to the process for making the mixed fertilizer in a stable form.

Organic reaction products of urea formaldehyde which contain water insoluble nitrogen have been suggested for use as fertilizers and methods for producing such materials have been described in patents of the prior art, as for example, U. S. P. 2,415,705, which issued February 11, 1947, to Leonard V. Rohner and Alvin P. Wood, as well as Patent No. 2,644,806, which issued to Mearl A. Kise on July 7, 1953. While these products have been used successfully alone and have, in some cases, been stabilized by special treatments, stable mixed fertilizers could not be prepared from them by the ordinary conventional dry mixing methods. When these materials are mixed to produce complete fertilizers in accordance with conventional dry mixing methods of the prior art, the products are not homogeneous, and the urea formaldehyde fertilizer quickly loses its nitrogen activity in storage. This is probably due to the acidic nature of the mixture. While heavy ammoniation of the normal or triple superphosphates to a pH of 6 or above, prior to admixture with the urea formaldehyde resin fertilizer, improves the stability of the urea formaldehyde in storage, the introduction of the ammoniacal nitrogen reduces the proportion of water insoluble and organic nitrogen in the products. This reduces its desirability as a slow acting fertilizer. In addition, when the conventional mixing equipment is used, after heavy ammoniation of the phosphates a considerable loss of ammonia is encountered, and there is a significant reversion of the $P_2O_5$. It has also been established that the incorporation of the urea formaldehyde resin fertilizer into the nitrophosphate fertilizer is not desirable since the temperature and acidities encountered in the nitrophosphate process are not suitable for handling urea formaldehyde and the finished product has a pH which is too low for maintaining the activity of the nitrogen in the urea formaldehyde.

It is an object of this invention to produce a mixed fertilizer which is stable, uniform, non-hygroscopic, granular, and has a high total plant food content.

It is a further object of this invention to produce a mixed fertilizer in which the organic nitrogen is higher than is normally encountered in mixed fertilizers.

It is a still further object of this invention to produce a mixed fertilizer in which the nitrogen becomes available at a slow rate and, therefore, makes the fertilizer particularly suitable for use in providing plant foods over a long growing period with a single application.

It is a still further object of this invention to produce a mixed fertilizer that can be applied at a heavy rate without danger of burning existing stands of grass or other vegetation.

In accordance with this invention, it has been found that these objects and other advantages incidental thereto can be attained by mixing the phosphate component with an alkali or alkaline earth base in an amount equal to 1.4 to 1.9 equivalents of base per mol of $P_2O_5$ in the phosphate, and either simultaneously or subsequently mixing in the urea formaldehyde resin (having a high nitrogen activity) and blending it therewith.

Mixed fertilizers containing 10 to 30% total nitrogen, 5 to 15% available $P_2O_5$ and 0 to 10% $K_2O$ can be prepared as a stable, uniform, non-hygroscopic, granular fertilizer having a high total plant food content in accordance with this invention. In making the fertilizers of this invention, commercial grades of superphosphate and triple superphosphate which have been ground to smaller than 25 mesh and preferably smaller than 50 mesh to insure complete reaction during a short mixing period and uniform dispersion in the finished product are charged to a mixing vessel. The amount of these materials so charged should be sufficient to give from 5 to 15% available $P_2O_5$ in the finished product, preferably the amount of $P_2O_5$ is held within the range of 7 to 12%. To this is added an alkali or alkaline earth base or combination of bases such as, for example, potassium hydroxide, calcined magnesite (essentially MgO), sodium hydroxide, potassium carbonate, and sodium carbonate. The base is added in an amount equal to 1.4 to 1.9 equivalents of base per mol of $P_2O_5$ in the phosphate. The urea formaldehyde resin, having a high nitrogen activity by A. O. A. C. neutral permanganate test as described in the Official Tentative Methods of Analysis, pages 15 and 16, seventh edition, 1950, of the Association of Official Agricultural Chemists, is then added to the mixture and the mass agitated with sufficient water to permit uniform blending. The urea formaldehyde resin which is preferably used should be characterized by (1) containing a nitrogen to carbon weight ratio in the range of 1.3 to 1.5, (2) containing 37.5 to 40.5 total nitrogen with about 4% water present of which at least 65% of the nitrogen is water insoluble by A. O. A. C. test. A urea formaldehyde resin made in accordance with the teaching of U. S. P. 2,644,806 is preferred for this purpose. When this urea formaldehyde fertilizer is used, it is preferably added as filter cake from the urea formaldehyde process. This cake contains about 75% water and on a dry basis will analyze about 39% nitrogen.

Urea formaldehyde resin fertilizer amounting to 250 to 780 pounds of dry urea formaldehyde per 1000 pounds of finished product is added to give from 10 to 30% total N, preferably 16 to 24% total N, in the product. The urea formaldehyde filter cake, if used, carries with it sufficient water to make the entire mass fluid enough for uniform mixing and reaction without added water. Potash salts may be added to the mixer to adjust the $K_2O$ content of the product to from 0 to 10%. It is preferably held within the range of 4 to 10%. Dolomite and trace elements are also added during the mixing period if these are desired to be present in the final product. When using the hydroxide bases the reaction can be completed in as little as one minute after addition of all raw materials. Use of the magnesium oxide or alkali carbonate as solids, however, extends the required mixing time to about ten minutes. At the completion of mixing, the mass contains from 15 to 70% water, preferably from 20 to 65% water, and has a pH of 6.0 to 7.5, preferably 6.5 to 7.0. These pH values are desirable to insure stability of the N in the product. The above-outlined process may be conducted batchwise or continuously.

Slurries of the product containing about 25% or less moisture can be fed directly to the drier. If the slurry contains more than about 25% moisture, it is preferably mixed in a device such as a pug mill with previously dried and ground product to produce a drier feed of from 10 to 25% water content, preferably from 12 to 20% water content. The product may then be dried in a rotary drier. Drying conditions are preferably regulated to deliver a product of 3 to 4% water content with a maximum product temperature of 100° C. The dried product is cooled and screened. All fines and oversize and such proportion of the product size material as required are recycled to the drier feed mixer. Oversize and also preferably all product size material to be recycled is preferably crushed in a hammer mill or other crusher to smaller than 30 mesh before it is blended with fresh slurry.

The following examples are given to illustrate the process of the invention.

Example 1

341.5 pounds of superphosphate and 73.3 pounds of triple superphosphate, analyzing respectively 20% and 46% available $P_2O_5$ (containing a total of 0.718 pound-mol of $P_2O_5$) are mixed with 121.5 pounds of 50% potassium hydroxide solution (containing 1.083 pound-mol of KOH) and 2066 pounds of urea formaldehyde filter cake [1] (containing 75% water and 9.88% total N) for about two minutes. No cooling is required and the temperature rise is under 15° C. The mixture has a water content of 60 to 65% and a pH of about 6.5. It is blended with 9230 pounds of fine recycle containing 4% water to produce a drier feed of 17% water content. The blended drier feed material is then dried in a rotary drier. Maximum product temperature in the drier is maintained at 100° C. After drying to 4% water content the charge yields 1000 pounds of product and 9230 pounds of recycle for further use in the process. The analysis of a product obtained in accordance with the above example was as follows: 20% total nitrogen of which 75% was water insoluble and 90% of the water insoluble N was active (by A. O. A. C. neutral permanganate test), 10% available $P_2O_5$, and 5% water soluble $K_2O$.

Example 2

218.2 pounds of superphosphate and 126.9 pounds of triple superphosphate analyzing 20% and 46% available $P_2O_5$ respectively (containing a total of 0.718 pound-mol of $P_2O_5$) are mixed with 57.4 pounds of sodium carbonate (containing 1.083 equivalents of sodium), 2066 pounds of urea formaldehyde filter cake (containing 75% water and 9.88% total N), and 85 pounds of muriate of potash (analyzing 60% $K_2O$). Mixing is continued for approximately ten minutes and yields an essentially homogeneous mass containing about 60 to 65% water with a pH of about 6.5. It is blended with approximately 8000 pounds of recycled dried material to yield a drier feed of 16 to 17% water content. After drying to about 4% water content the dried material weighs approximately 9800 pounds of which 1000 pounds is product and the remainder recycle for further drying operations. Product analysis is essentially the same as for Example 1, above.

Example 3

50 pounds of 22–10–5 fertilizer is produced as follows:

(a) 12 pounds of triple superphosphate (containing 44.7% of $P_2O_5$ and 5% $H_2O$) is neutralized by mixing with 6.08 pounds of KOH solution (containing 3.04 pounds of KOH, 0.34 pound of salt and 2.7 pounds of water) in a sigma arm mixer.

(b) 27 pounds of essentially dry urea formaldehyde fertilizer (ground to pass a 14 mesh screen), 7 pounds of ground dolomite and 4.5 pounds of water are then added to the neutral triple superphosphate and this mixture is blended in the sigma arm mixer.

(c) The blended mixture is dried in a rotary showering type drum drier at an inlet air temperature of 160° C. for twenty minutes.

(d) The dried product is crushed in a hammer mill and passed through a 14 mesh screen. Product analyses: 22.4% total nitrogen of which 74.9% is water insoluble by A. O. A. C. test and over 90% of the water insoluble nitrogen is active by A. O. A. C. neutral permanganate test; 10.6% available $P_2O_5$; 0.4% citrate insoluble $P_2O_5$; 5.7% water soluble $K_2O$; bulk density 0.86 g./cc.; moisture content 3.2%.

Example 4

341.5 pounds of superphosphate and 73.3 lbs. of triple superphosphate, analyzing respectively 20% and 46% $P_2O_5$ (containing a total of 0.718 pound-mol of $P_2O_5$) are mixed with 74.8 lbs. of potassium carbonate (containing 0.541 mol of $K_2CO_3$) and 2065.8 lbs. of ureaform (containing 75% water and 9.88% total N) for about 10 minutes. No cooling is required and the temperature rise is under 10 degrees. The prepared cake has a moisture content of 60 to 65% and a pH of about 6.5. It is blended with 9230 pounds of fine recycle containing about 4% water to produce a drier feed of about 17% water content. The blended drier feed is dried in a rotary drier limiting the maximum product temperature to 100° C. After drying to 4% water content, the charge yields 1000 lbs. of product, and 9230 lbs. of recycle are recovered for further use in the process. Product analyses on products produced in accordance with the above example were substantially the same as for Example 1.

The product produced in accordance with this invention is a stable, uniform, non-hygroscopic, granular fertilizer of high total plant food content. Its organic nitrogen is usually high for a mixed fertilizer. Because of the low solubility and slow availability of the nitrogen, the product is particularly well suited for use in providing plant foods over a long growing period with only a single application. Furthermore, its inherent properties make it possible to apply extraordinarily heavy applications of the fertilizer without danger of burning existing stands of grass or other vegetation.

The term "metallic base" as used in the claims is intended to cover the alkali metal hydroxides and carbonates and the alkaline earth metal (including magnesium) oxides and hydroxides.

While the above description discloses preferred and practical embodiments of the product and process for making the mixed fertilizers in accordance with this invention, it will be understood that the specific details described are by way of illustration and are not to be construed as limiting the scope of the invention.

We claim:

1. In the process of making a mixed fertilizer in which nitrogen is supplied in the form of a reaction product of urea and formaldehyde, the steps comprising mixing a super phosphate with a metallic base in an amount equal to 1.4 to 1.9 mol equivalents of base per mol of $P_2O_5$ in the phosphate, mixing in a urea formaldehyde resin fertilizer and blending to form a mixture having a pH of 6.0 to 7.5.

2. In the process of making a stable, mixed fertilizer in which nitrogen is supplied in the form of a reaction product of urea and formaldehyde, the steps comprising mixing a super phosphate with an alkali metal base in an amount equal to 1.4 to 1.9 mol equivalents of base per mol of $P_2O_5$ in the phosphate, mixing in a urea formaldehyde resin fertilizer and blending to form a mixture having a pH of 6.0 to 7.5.

3. In the process of making a stable, mixed fertilizer in which nitrogen is supplied in the form of a reaction product of urea and formaldehyde, the steps comprising

---

[1] Made as described in Example 1 of U. S. P. 2,644,806.

mixing a super phosphate with KOH in an amount equal to 1.4 to 1.9 mol equivalents of base per mol of $P_2O_5$ in the phosphate, mixing in a urea formaldehyde resin fertilizer and blending to form a mixture having a pH of 6.0 to 7.5.

4. In the process of making a stable, mixed fertilizer containing 10 to 30% N, 5 to 15% available $P_2O_5$, and 0 to 10% $K_2O$ in which nitrogen is supplied in the form of a reaction product of urea and formaldehyde, the steps comprising mixing a superphosphate with a metallic base in an amount equal to 1.4 to 1.9 mol equivalents of base per mol of $P_2O_5$ in the phosphate, mixing in a urea formaldehyde resin fertilizer in an amount to give 10 to 30% N in the final product, adding potash salt to adjust the $K_2O$ content of the product and blending to form a mixture having a pH of 6.0 to 7.5.

5. In the process of making a mixed fertilizer in which nitrogen is supplied in the form of a reaction product of urea and formaldehyde, the steps comprising mixing a super phosphate with an alkali metal base in an amount equal to 1.4 to 1.9 mol equivalents of base per mol of $P_2O_5$ in the phosphate, mixing in a urea formaldehyde resin fertilizer, adding potash salts during the mixing period to adjust the $K_2O$ content of the product and blending to form a mixture having a pH of 6.0 to 7.5.

6. In the process of making a stable, mixed fertilizer containing 10 to 30% N, 5 to 15% available $P_2O_5$, and 0 to 10% $K_2O$, in which nitrogen is supplied in the form of a reaction product of urea and formaldehyde, the steps comprising mixing a superphosphate with KOH in an amount equal to 1.4 to 1.9 mol equivalents of base per mol of $P_2O_5$ in the phosphate, mixing in a urea formaldehyde resin fertilizer in an amount to give 10 to 30% N in the final product and blending to form a mixture having a pH of 6.0 to 7.5.

7. In the process of making a stable, mixed fertilizer containing 10 to 30% N, 5 to 15% available $P_2O_5$, and 0 to 10% $K_2O$, in which nitrogen is supplied in the form of a reaction product of urea and formaldehyde, the steps comprising mixing a superphosphate with $K_2CO_3$ in an amount equal to 1.4 to 1.9 mol equivalents of base per mol of $P_2O_5$ in the phosphate, mixing in a urea formaldehyde resin fertilizer in an amount to give 10 to 30% N in the final product and blending to form a mixture having a pH of 6.0 to 7.5.

References Cited in the file of this patent

UNITED STATES PATENTS

| | | |
|---|---|---|
| 1,953,419 | MacIntire | Apr. 3, 1934 |
| 2,136,793 | Gabeler | Nov. 15, 1938 |
| 2,415,705 | Rohner | Feb. 11, 1947 |
| 2,592,809 | Kralovec | Apr. 15, 1952 |
| 2,618,546 | Davenport | Nov. 18, 1952 |
| 2,643,948 | Sourdet | June 30, 1953 |
| 2,644,806 | Kise | July 7, 1953 |

UNITED STATES PATENT OFFICE
CERTIFICATE OF CORRECTION

Patent No. 2,864,685                               December 16, 1958

Charles E. Waters et al.

It is hereby certified that error appears in the printed specification of the above numbered patent requiring correction and that the said Letters Patent should read as corrected below.

Column 3, line 24, for "mol" read -- mols --; line 32, for "dier" read -- drier --; line 55, for "8000 pounds" read -- 8800 pounds --; column 4, line 3, after "rotary" insert a comma; line 38, for "usually" read -- unusually --.

Signed and sealed this 9th day of June 1959.

(SEAL)
Attest:

KARL H. AXLINE                                        ROBERT C. WATSON
Attesting Officer                                     Commissioner of Patents